United States Patent
Lee et al.

(10) Patent No.: US 9,791,961 B2
(45) Date of Patent: Oct. 17, 2017

(54) TOUCH SENSITIVE DEVICE, SYSTEM AND METHOD THEREOF

(71) Applicants: APEX MATERIAL TECHNOLOGY CORP., Keelung (TW); IMAGINATION BROADWAY LTD., New Taipei (TW)

(72) Inventors: Shang-Li Lee, Keelung (TW); Zong-Bin Liao, Keelung (TW); Ke-Hao Ding, Keelung (TW)

(73) Assignees: APEX MATERIAL TECHNOLOGY CORP., Keelung (TW); IMAGINATION BROADWAY LTD., New Taipei (TW)

( * ) Notice: Subject to any disclaimer, the term of this patent is extended or adjusted under 35 U.S.C. 154(b) by 140 days.

(21) Appl. No.: 14/567,176

(22) Filed: Dec. 11, 2014

(65) Prior Publication Data

US 2016/0048258 A1   Feb. 18, 2016

(30) Foreign Application Priority Data

Aug. 15, 2014   (TW) .............................. 103128061 A

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01)

(58) Field of Classification Search
CPC . G06F 3/02; G06F 3/041; G06F 3/045; G06F 3/042; G09G 5/00; G01R 27/26
See application file for complete search history.

(56) References Cited

U.S. PATENT DOCUMENTS

| 2014/0132534 A1* | 5/2014 | Kim | G06F 3/0412 345/173 |
|---|---|---|---|
| 2014/0152616 A1* | 6/2014 | Kida | G06F 3/0418 345/174 |
| 2014/0176465 A1* | 6/2014 | Ma | G06F 3/041 345/173 |
| 2015/0116246 A1* | 4/2015 | Nagata | G06F 3/041 345/173 |

* cited by examiner

*Primary Examiner* — Pegeman Karimi
(74) *Attorney, Agent, or Firm* — WPAT, PC

(57) ABSTRACT

A touch sensitive detecting method, applicable to a touch panel or screen, comprises: setting a sensing electrode to floating; after the sensing electrode is set to floating, setting at least one non-measuring sensing electrode to a sensing high voltage; measuring the voltage of the sensing electrode; setting the sensing electrode to a ground voltage and stopping measurement; and determining whether an externally conducted object is approximating or touching the touch panel or screen nearby the sensing electrode by comparing a difference between a threshold voltage and the measured voltage of the sensing electrode.

14 Claims, 7 Drawing Sheets

TOUCH SENSITIVE DEVICE, SYSTEM AND METHOD THEREOF

CROSS-REFERENCE TO RELATED APPLICATIONS

This application claims the benefit of priority to Taiwan patent application Ser. No. 103128061 entitled "TOUCH SENSITIVE DEVICE, SYSTEM and METHOD THEREOF", filed, Aug. 15, 2014, which is also incorporated herein by reference.

FIELD OF THE INVENTION

The present invention pertains to a touch panel technology, and more particularly pertains to a touch sensitive panel technology for reducing conductive liquid mistaken for touch point.

BACKGROUND OF THE INVENTION

A touch panel or screen is one of the major interfaces between human and machine in modern mobile device. A mobile device may be used outdoor or in damp place, so it may be touched with water or other conductive liquid on the touch panel or screen. Random size and shape of the conductive liquid causes problematic uncertainties when detecting the real touches.

In the conventional mutual capacitance touch panel technology, part of charges from the driving voltage will be taken away when external conductive object such as a finger or a stylus approximates or touches the touch panel or screen. It causes the measured voltage on the sensing electrodes drop. However, the random sized and shaped conductive liquid does not connect to the ground. In some cases, the conductive liquid causes the measured voltage on the sensing electrode to rise, which is different from effects caused by a finger. In another cases, the conductive liquid causes the measured voltage on the sensing electrode drop, which can be mistaken to be an external conductive object.

Above all, a touch sensitive method and device for distinguishing the conductive liquid from the external conductive object is needed.

SUMMARY OF THE PRESENT INVENTION

The present invention provides a touch sensitive detecting method, which is applicable to a touch panel or screen. The touch sensitive detecting method includes steps of: setting a sensing electrode to floating; after the sensing electrode is set to floating, setting at least one non-measuring sensing electrode to a sensing high voltage; measuring the voltage of the sensing electrode; setting the sensing electrode to a ground voltage and stopping measurement; and determining whether an externally conducted object is approximating or touching the touch panel or screen nearby the sensing electrode by comparing a difference between a threshold voltage and the measured voltage of the sensing electrode.

In one embodiment, the present invention provides a touch sensitive device, which is applicable to a touch panel or screen, and the touch sensitive device is configured to execute said touch sensitive detecting method.

In another embodiment, the present invention provides a touch sensitive system including a touch panel or screen and the touch sensitive device. The touch sensitive device is configured to execute said touch sensitive detecting method.

DETAILED DESCRIPTION OF THE INVENTION

It is to be understood that both the foregoing general description and the following detailed description are exemplary and explanatory only and are not restrictive of the invention, as claimed. It should be noted that, as used in the specification and the appended claims, the singular forms "a", "an" and "the" include plural referents unless the context clearly dictates otherwise. It should be noted that the figures are merely for convenience of explanation and the proportional relationship is not necessarily correct.

Figure 1:
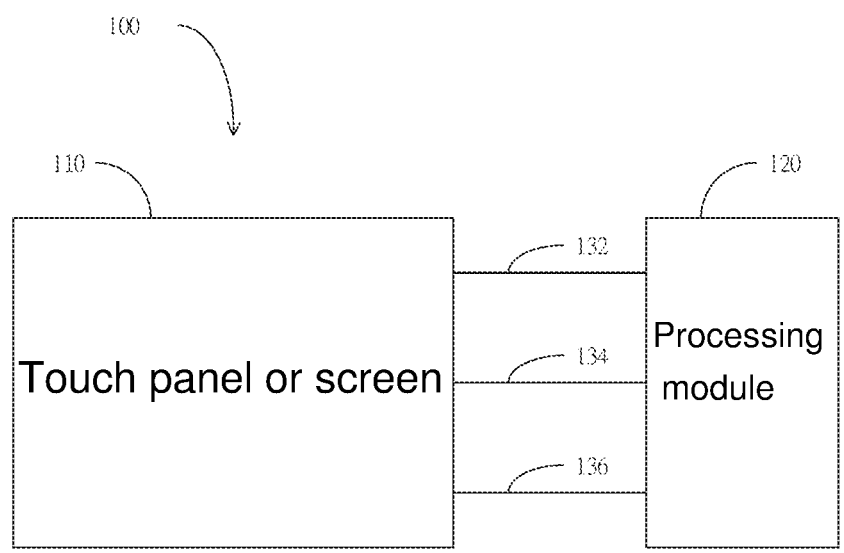
FIG. 1 is a diagram of a touch sensitive system 100 according to the present invention.

Please refer to FIG. 1, which is a diagram of a touch sensitive system 100 according to the present invention. The touch sensitive system 100 at least includes a touch panel or screen 110 and a processing module 120. The touch panel or screen 110 includes a plurality of driving electrodes and a plurality of sensing electrodes thereon. The processing module 120 is electrically connected to the driving electrodes by a plurality of driving electrical wires 132, and is electrically connected to the sensing electrodes by a plurality of sensing electrical wires 134. A person of ordinary skill in the art would recognize that the connection relationship between the driving electrode and the driving electrical wire 132 may be one to one, or many to one. Similarly, the connection relationship between the sensing electrode and the sensing electrical wire 134 may be one to one, or many to one. The present invention is not restricted made thereto.

In some embodiments, the touch panel or screen 110 further includes a plurality of dummy pads or dummy traces. In one embodiment, the dummy pads are electrically connected to the processing module 120 by one dummy electrical wire 136. In another embodiment, the dummy pads are divided into many areas or sections, and the areas or sections of the dummy pads are electrically connected to the processing module 120 by a plurality of dummy electrical wire 136 respectively.

A person of ordinary skill in the art would recognize that there are many configurations of the driving electrodes, the sensing electrodes and the dummy pads disposed on the touch panel or screen 110, and the present invention is not to be restricted thereto. For example, FIGS. 2A to 3D of Taiwan patent No. 1378377 entitled "CAPACITIVE TOUCH PANEL AND MANUFACTURING METHOD THEREOF", applied by AU Optronics Corp., which are for reference.

Figure 2:
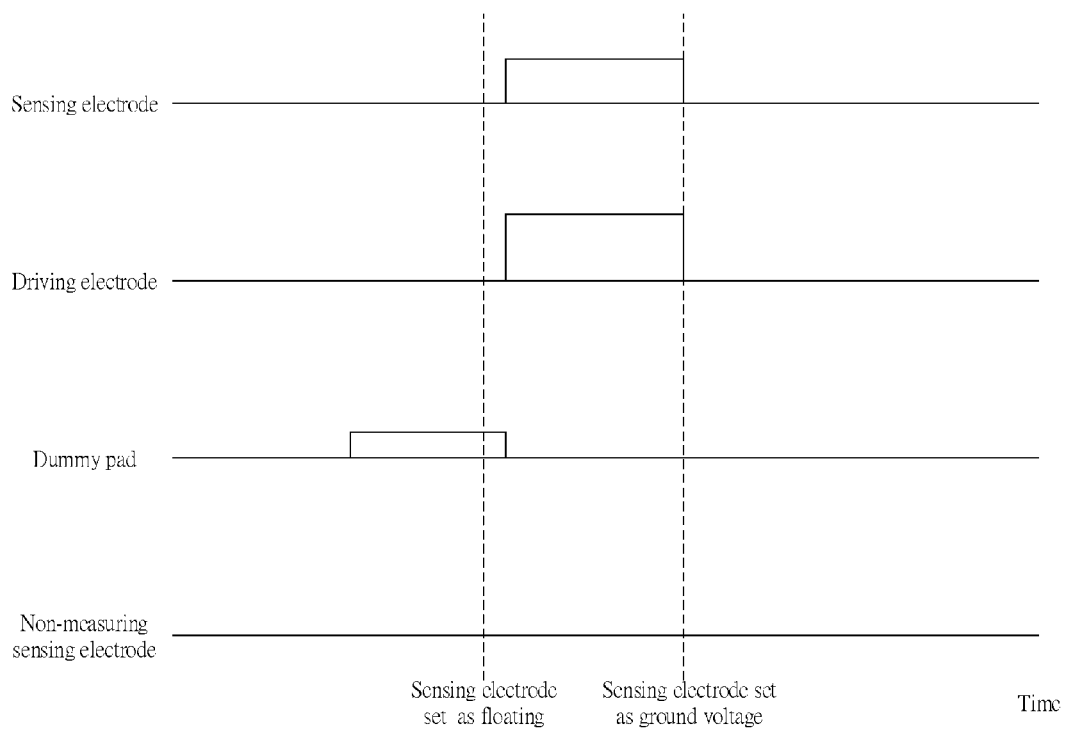
FIG. 2 is a waveform diagram of the detected conductive liquid according to an embodiment of the present invention.

Refer to FIG. 2, which is a waveform diagram of the detected conductive liquid according to an embodiment of the present invention. The horizontal axes represent the time, and the vertical axes respectively represent voltages of one of the sensing electrodes, one of the driving electrodes, the dummy pad, and non-measuring sensing electrode. There are two time points on the horizontal axis. One time point is when the sensing electrode set by the processing module 120 to floating, and the other time point is when the sensing electrode set by the processing module 120 to the ground voltage. It should be noted that the relationship between the voltage and the time as shown in FIG. 2 is merely for convenience of explanation and the proportional relationship is not necessarily correct.

As shown in FIG. 2, before detecting the conductive liquid on an intersection point of the sensing electrode and the driving electrode, the voltage of the dummy pad nearby the intersection point is risen to a dummy high voltage, which is defined as a voltage higher than the ground voltage. Next, the sensing electrode is set to floating. Then, the voltage of the driving electrode is risen to a driving voltage, and the voltage of the dummy pad is fallen. It is noted that the sequential steps of rising the voltage of the driving electrode and falling the voltage of the dummy pad are not to be restricted thereto. After a period of time until the charges between the electrodes or pads are balanced, start converting the voltage, i.e. measuring the sensing electrode. After the measurement is over, the voltage of the driving electrode is fallen to the ground voltage. By comparing a difference between a threshold voltage and the measured voltage of the sensing electrode, whether an externally conducted object is approximating or touching the touch panel or screen nearby the sensing electrode can be determined. As the background mentioned, an external conductive object such as finger approximating or touching the touch panel or screen usually causes the voltage of the sensing electrodes to fall to the afore-said threshold voltage. The measured voltage of the sensing electrode may fall or rise when conductive liquid is approximating or touching the touch panel or screen; however, the measured voltage of the sensing electrode falls less if the conductive liquid causes the measured voltage drop. Therefore, we can determine that there is an externally conducted object approximating or touching the touch panel or screen nearby the sensing electrode when the measured voltage of the sensing electrode is lower than or equal to the threshold voltage; otherwise, there could be conductive liquid approximating or touching the touch panel or screen.

In one embodiment, the driving voltage risen by the driving electrodes is higher than the dummy high voltage risen by the dummy pad. In another embodiment, the voltage of the dummy pad can be fallen to the ground voltage.

Figure 3:
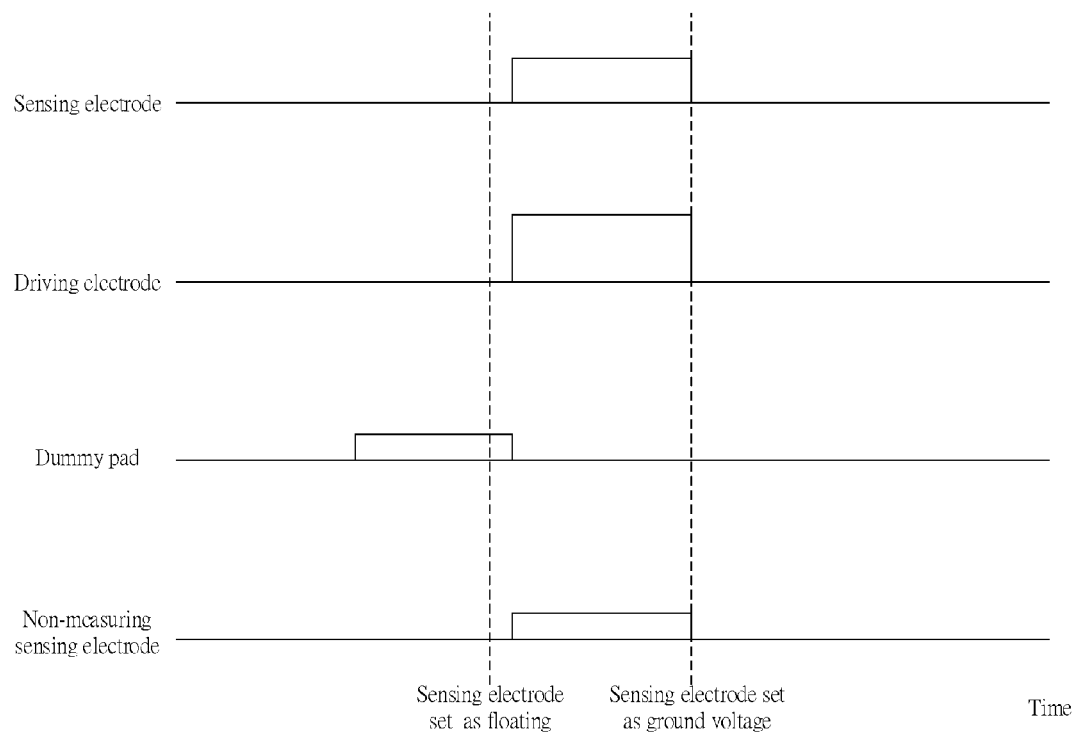
FIG. 3 is a waveform diagram of the detected conductive liquid according to another embodiment of the present invention.

Refer to FIG. 3, which is a waveform diagram of the detected conductive liquid according to another embodiment of the present invention. Compared the embodiment in FIG. 3 to that in FIG. 2, the non-measuring sensing electrode is further driven so the voltage change of the non-measuring sensing electrode is shown as FIG. 3. In one embodiment, the non-measuring sensing electrode may be a single electrode adjacent to one side of the sensing electrode for being measured, or two electrodes respectively adjacent to two sides of the sensing electrode. In another embodiment, the non-measuring sensing electrode may be a plurality of electrodes nearby the sensing electrode for being measured.

As shown in FIG. 3, after the voltage of the driving electrode is risen to the driving voltage, the voltage of the non-measuring sensing electrode is also risen to a sensing high voltage, which is defined as a voltage higher than the ground voltage, until the measurement is over. By comparing a difference between a threshold voltage and the measured voltage of the sensing electrode, whether an externally conducted object is approximating or touching the touch panel or screen nearby the sensing electrode can be determined. As the background mentioned, an external conductive object such as a finger approximating or touching the touch panel or screen usually causes the voltage of the sensing electrodes to fall to the afore-said threshold voltage. The measured voltage of the sensing electrode may fall or rise when conductive liquid is approximating or touching the touch panel or screen; however, the measured voltage of the sensing electrode falls less if the conductive liquid causes the measured voltage drop. Therefore, we can determine there is an externally conducted object approximating or touching the touch panel or screen nearby the sensing electrode when the measured voltage of the sensing electrode is lower than or equal to the threshold voltage; otherwise, there could be conductive liquid approximating or touching the touch panel or screen.

In one embodiment, the driving voltage risen by the driving electrodes is higher than the sensing high voltage risen by the non-measuring sensing electrode. In another embodiment, the dummy high voltage risen by the dummy pad is equal to the sensing high voltage risen by the non-measuring sensing electrode. In another embodiment, the dummy high voltage set by the dummy pad is higher than the sensing high voltage set by the non-measuring sensing electrode, and the present invention is not to be restricted thereto.

Figure 4:
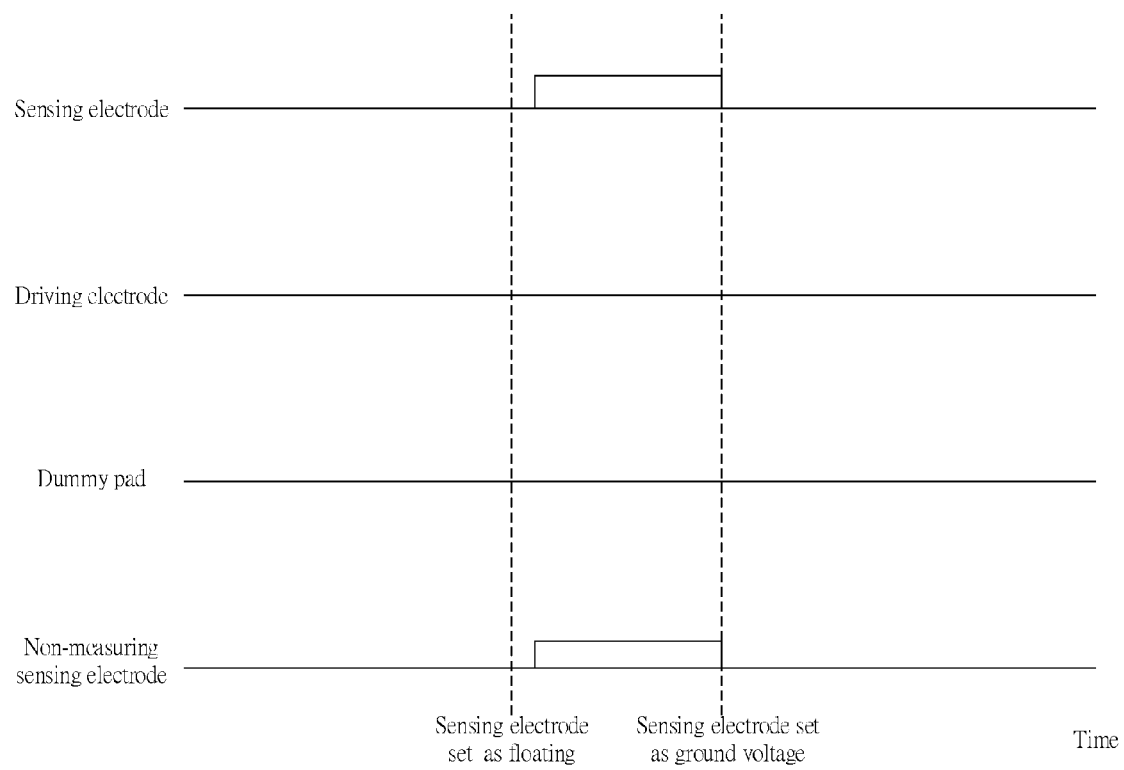
FIG. 4 is a waveform diagram of the detected conductive liquid according to another embodiment of the present invention.

Refer to FIG. 4, which is a waveform diagram of the detected conductive liquid according to another embodiment of the present invention. Before the sensing electrode is set to floating, the voltage of the dummy pad can be set to a ground voltage, or a voltage lower than a sensing high voltage set later by the non-measuring sensing electrodes. After the sensing electrode is set to floating, the non-measuring sensing electrode is set to the fixed sensing high voltage until the measurement is over. By comparing a difference between a threshold voltage and the measured voltage of the sensing electrode, whether an externally conducted object is approximating or touching the touch panel or screen nearby the sensing electrode can be determined. As the background mentioned, an external conductive object such as a finger approximating or touching the touch panel or screen usually causes the voltage of the sensing electrodes to fall to the afore-said threshold voltage. The measured voltage of the sensing electrode may fall or rise when conductive liquid is approximating or touching the touch panel or screen; however, the measured voltage of the sensing electrode falls less if the conductive liquid causes the measured voltage drop. Therefore, we can determine there is an externally conducted object approximating or touching the touch panel or screen nearby the sensing electrode when the measured voltage of the sensing electrode is lower than or equal to the threshold voltage; otherwise, there could be conductive liquid approximating or touching the touch panel or screen.

Figure 5:
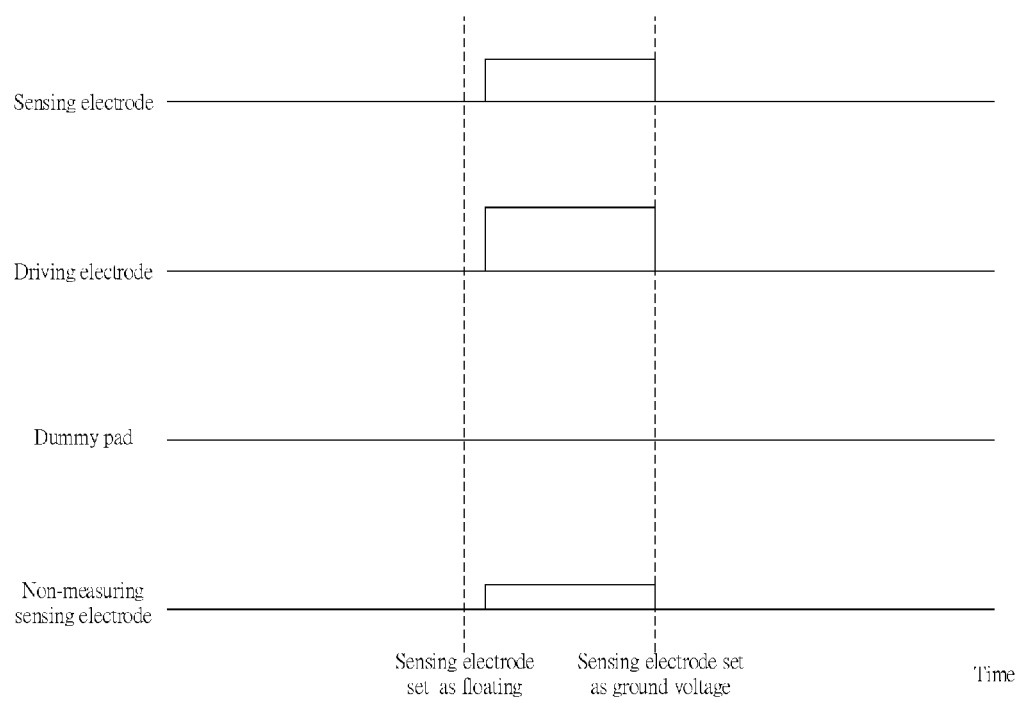
FIG. 5 is a waveform diagram of the detected conductive liquid according to another embodiment of the present invention.

Refer to FIG. 5, which is a waveform diagram of the detected conductive liquid according to another embodiment of the present invention. Before the sensing electrode is set to floating, the voltage of the dummy pad can be set to a ground voltage, or a voltage lower than the sensing high voltage set later by the driving electrode and the non-measuring sensing electrodes. After the sensing electrode is set to floating, the driving electrode and the non-measuring sensing electrode are set to a fixed voltage; for example, the non-measuring sensing electrode is set to the sensing high voltage, and the driving electrode is set to the driving voltage. Stay for a period of time. After the charges between the electrodes or pads are balanced, start converting the voltage, i.e. measuring the sensing electrode, until the measurement is over. It is noted that the sequential steps of setting the non-measuring sensing electrode to the sensing high voltage and setting the driving electrode to the driving voltage are not to be restricted thereto. Similarly, the values of the driving voltage and the sensing high voltage are not restricted thereto. In one embodiment, the driving voltage risen by the driving electrode is higher than the sensing high voltage risen by the non-measuring sensing electrode.

By comparing a difference between a threshold voltage and the measured voltage of the sensing electrode, whether an externally conducted object is approximating or touching the touch panel or screen nearby the sensing electrode can be determine. As the background mentioned, an external conductive object such as a finger approximating or touching the touch panel or screen usually causes the voltage of the sensing electrodes to fall to the afore-said threshold voltage. The measured voltage of the sensing electrode may fall or rise when conductive liquid is approximating or touching the touch panel or screen; however, the measured voltage of the sensing electrode falls less if the conductive liquid causes the measured voltage drop. Therefore, we can determine there is an externally conducted object approximating or touching the touch panel or screen nearby the sensing electrode when the measured voltage of the sensing electrode is lower than or equal to the threshold voltage; otherwise, there could be conductive liquid approximating or touching the touch panel or screen.

Figure 6:
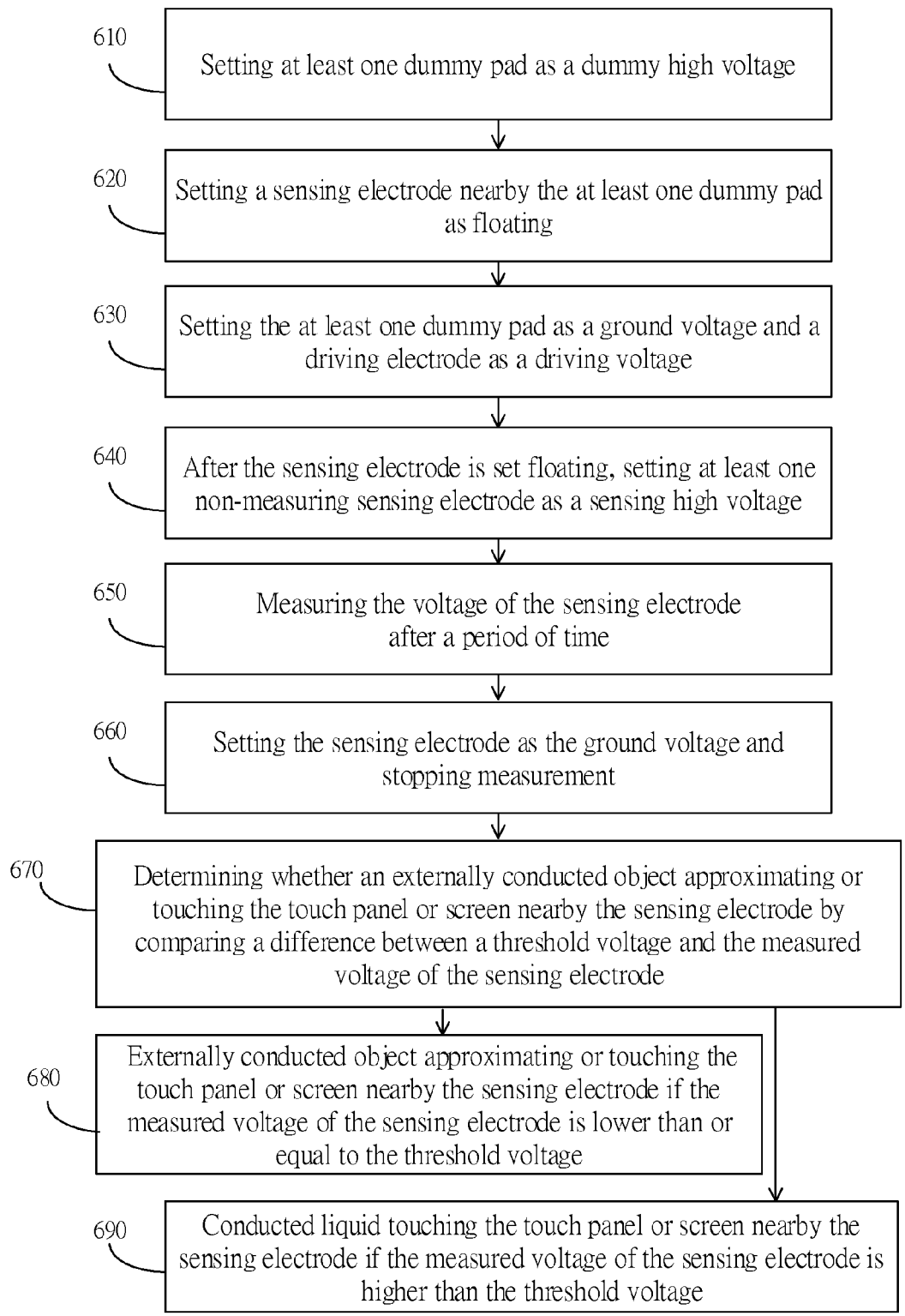
FIG. 6 is a flow chart of a touch sensitive method according to an embodiment of the present invention.

Please refer to FIG. 6, which is a flow chart of a touch sensitive method according to an embodiment of the present invention. The touch sensitive method is implemented in the touch sensitive system 100 by the processing module 120 as shown in FIG. 1. The embodiments in FIGS. 2 and 3 are herein for reference. The steps of the touch sensitive method are included as follows.

Step 610: Setting at least one dummy pad to a dummy high voltage. In one embodiment, the voltages of the driving electrode and the non-measuring sensing electrodes respectively are lower than the driving voltage and the sensing high voltage.

Step 620: Setting a sensing electrode nearby the at least one dummy pad to floating after setting the at least one dummy pad to the dummy high voltage.

Step 630: Setting the at least one dummy pad to a ground voltage and a driving electrode to a driving voltage after the sensing electrode is set to floating. Wherein the dummy high voltage is higher than the ground voltage.

Selective step 640: Setting at least one non-measuring sensing electrode to a sensing high voltage after the sensing electrode is set to floating.

Step 650: After a period of time, measuring the voltage of the sensing electrode.

Step 660: Setting the sensing electrode to the ground voltage and stopping measurement.

Step 670: Determining whether an externally conducted object is approximating or touching the touch panel or screen nearby the sensing electrode by comparing a difference between a threshold voltage and the measured voltage of the sensing electrode. Go to step 680 if the measured voltage of the sensing electrode is lower than or equal to the threshold voltage; if not, go to step 690.

Step 680: Determining there is an externally conducted object approximating or touching the touch panel or screen nearby the sensing electrode.

Step 690: Determining there is conducted liquid touching the touch panel or screen nearby the sensing electrode.

Figure 7:
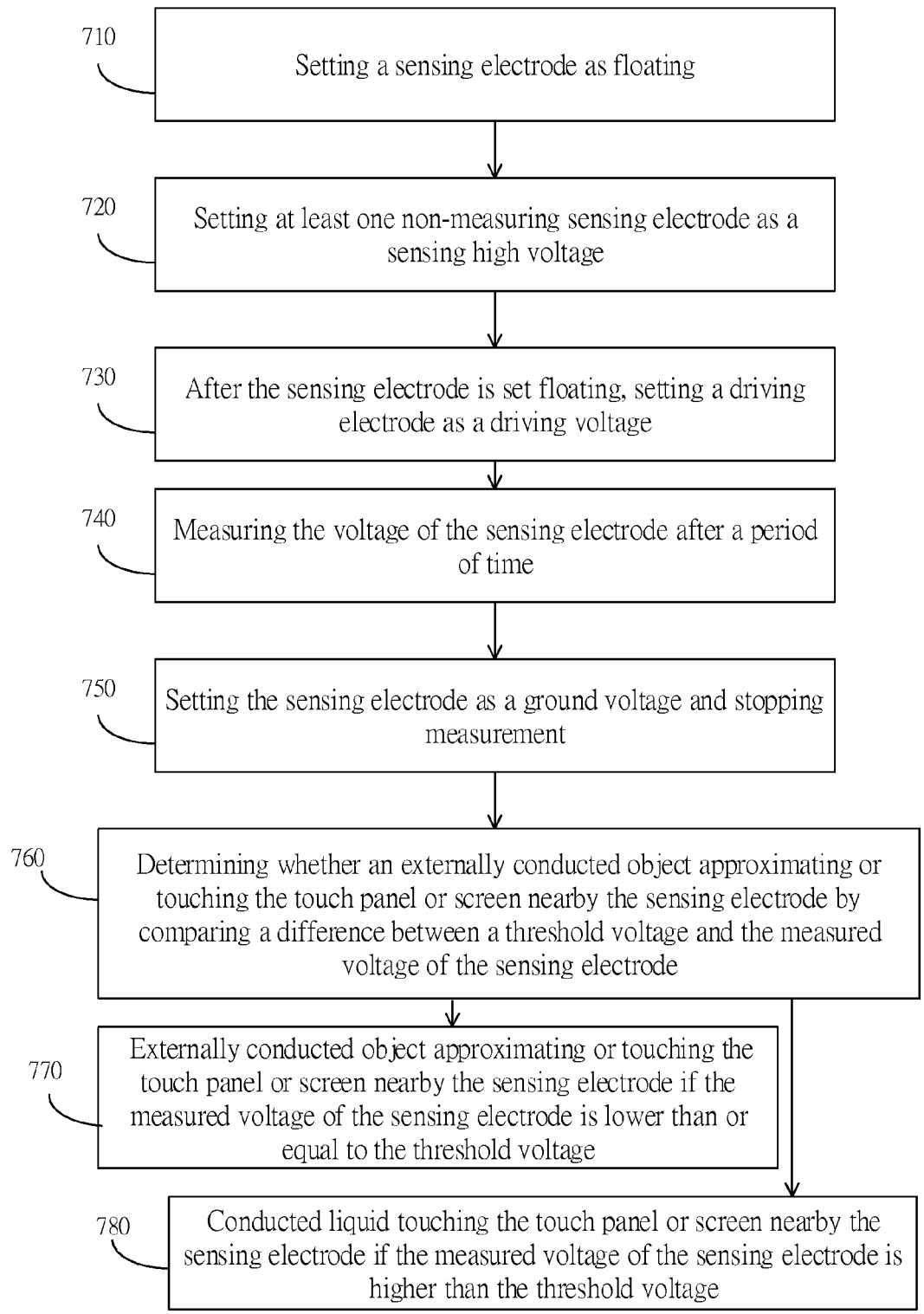
FIG. 7 is a flow chart of a touch sensitive method according to another embodiment of the present invention.

Please refer to FIG. 7, which is a flow chart of a touch sensitive method according to another embodiment of the present invention. The touch sensitive method is implemented in the touch sensitive system 100 by the processing module 120 as shown in FIG. 1. The embodiments in FIGS. 4 and 5 are herein for reference. The steps of the touch sensitive method are included as follows.

Step 710: Setting a sensing electrode to floating. In one embodiment, the voltage of the driving electrode is set to a voltage lower than the sensing high voltage and the driving voltage as shown in FIG. 4. In another embodiment, the voltage of the dummy pad nearby is set to a voltage lower than the sensing high voltage and the driving voltage as shown in FIG. 5.

Step 720: Setting at least one non-measuring sensing electrode to a sensing high voltage after the sensing electrode is set to floating.

Selective step 730: Setting a driving electrode to a driving voltage after the sensing electrode is set to floating.

Step 740: After a period of time, measuring the voltage of the sensing electrode.

Step 750: Setting the sensing electrode to a ground voltage and stopping measurement.

Step 760: Determining whether an externally conducted object is approximating or touching the touch panel or screen nearby the sensing electrode by comparing a difference between a threshold voltage and the measured voltage of the sensing electrode. Go to step 770 if the measured voltage of the sensing electrode is lower than or equal to the threshold voltage; if not, go to step 780.

Step 770: Determining there is an externally conducted object approximating or touching the touch panel or screen nearby the sensing electrode.

Step 780: Determining there is conducted liquid touching the touch panel or screen nearby the sensing electrode.

The above embodiments are only used to illustrate the principles of the present invention, and they should not be construed as to limit to the present invention in any way. The above embodiments may be modified by those with ordinary skill in the art without departing from the scope of the present invention as defined in the following appended claims.

What is claimed is:

1. A touch sensitive detecting method, applicable to a touch panel or screen, comprising:
    setting a sensing electrode to floating;
    setting a non-measuring sensing electrode to a sensing high voltage after the sensing electrode is set to floating;
    measuring the voltage of the sensing electrode;
    setting the sensing electrode to a ground voltage and stopping measurement; and
    determining whether an externally conducted object is approximating or touching the touch panel or screen nearby the sensing electrode by comparing a difference between a threshold voltage and the measured voltage of the sensing electrode; and
    determining that there is conducted liquid on the touch panel or screen nearby the sensing electrode when the measured voltage of the sensing electrode is higher than the threshold voltage.

2. The method according to claim 1, further comprising: after the sensing electrode is set to floating, setting a driving electrode to a driving voltage.

3. The method according to claim 2, wherein the driving voltage is higher than the dummy high voltage.

4. The method according to claim 2, further comprising: before the sensing electrode is set to floating, setting the driving electrode to a voltage lower than the sensing high voltage and the driving voltage.

5. The method according to claim 2, further comprising: setting at least one dummy pad nearby the sensing electrode to a voltage lower than the sensing high voltage and the driving voltage.

6. The method according to claim 1, wherein determining the externally conducted object is approximating or touching the touch panel or screen nearby the sensing electrode if the measured voltage of the sensing electrode is lower than the threshold voltage.

7. A touch sensitive device, applicable to a touch panel or screen, comprising:
  a sensing electrode;
  at least one non-measuring sensing electrode; and
  a processing circuit, electrically connected to the sensing electrode, the at least one non-measuring sensing electrode and the touch panel or screen;
  wherein the processing circuit sets the sensing electrode to floating; after the sensing electrode is set to floating, the processing circuit sets the at least one non-measuring sensing electrode to a sensing high voltage; the processing circuit measures the voltage of the sensing electrode; the processing circuit sets the sensing electrode to a ground voltage and stopping measurement; the processing circuit determines whether an externally conducted object is approximating or touching the touch panel or screen nearby the sensing electrode by comparing a difference between a threshold voltage and the measured voltage of the sensing electrode; and the processing circuit determines that there is conducted liquid on the touch panel or screen nearby the sensing electrode when the measured voltage of the sensing electrode is higher than the threshold voltage.

8. The device according to claim 7, wherein the processing circuit further sets a driving electrode to a driving voltage after the sensing electrode is set to floating.

9. The device according to claim 8, wherein the driving voltage is higher than the dummy high voltage.

10. The device according to claim 8, wherein the processing circuit further sets the driving electrode to a voltage lower than the sensing high voltage and the driving voltage before the sensing electrode is set to floating.

11. The device according to claim 8, wherein the processing circuit further sets at least one dummy pad nearby the sensing electrode to a voltage lower than the sensing high voltage and the driving voltage.

12. The device according to claim 7, wherein the externally conducted object is determined approximating or touching the touch panel or screen nearby the sensing electrode if the measured voltage of the sensing electrode is lower than the threshold voltage.

13. The device according to claim 7, wherein conducted liquid is determined on the touch panel or screen nearby the sensing electrode if the measured voltage of the sensing electrode is higher than the threshold voltage.

14. A touch sensitive system, comprising:
  a touch panel or screen; and,
  a processing circuit, electrically connected to the touch panel or screen;
  wherein the processing circuit sets a sensing electrode to floating;
  wherein after the sensing electrode is set to floating, the processing circuit sets at least one non-measuring sensing electrode to a sensing high voltage;
  wherein the processing circuit measures the voltage of the sensing electrode, and the processing circuit sets the sensing electrode to a ground voltage and stopping measurement; and
  wherein the processing circuit determines whether an externally conducted object is approximating or touching the touch panel or screen nearby the sensing electrode by comparing a difference between a threshold voltage and the measured voltage of the sensing electrode, and the processing circuit determines that there is conducted liquid on the touch panel or screen nearby the sensing electrode when the measured voltage of the sensing electrode is higher than the threshold voltage.

\* \* \* \* \*